(12) United States Patent
Silverstein et al.

(10) Patent No.: US 12,278,796 B1
(45) Date of Patent: Apr. 15, 2025

(54) CONTEXT BASED USER NOTIFICATION ADJUSTMENT AND MANAGEMENT

(71) Applicant: International Business Machines Corporation, Armonk, NY (US)

(72) Inventors: Zachary A. Silverstein, Georgetown, TX (US); Jeremy R. Fox, Georgetown, TX (US); Logan Bailey, Atlanta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/492,926

(22) Filed: Oct. 24, 2023

(51) Int. Cl.
| | |
|---|---|
| *G06F 15/16* | (2006.01) |
| *G06F 40/35* | (2020.01) |
| *H04L 51/043* | (2022.01) |
| *H04L 51/226* | (2022.01) |

(52) U.S. Cl.
CPC ............ *H04L 51/226* (2022.05); *G06F 40/35* (2020.01); *H04L 51/043* (2013.01)

(58) Field of Classification Search
CPC ...... H04L 51/226; H04L 51/043; G06F 40/35
See application file for complete search history.

(56) References Cited

U.S. PATENT DOCUMENTS

| | | |
|---|---|---|
| 10,176,808 B1 | 1/2019 | Lovitt et al. |
| 2006/0004665 A1* | 1/2006 | Stefik ................... G06Q 10/101 705/51 |
| 2013/0029695 A1 | 1/2013 | Rychlik |
| 2015/0207765 A1 | 7/2015 | Brantingham et al. |
| 2018/0103149 A1 | 4/2018 | Skiba et al. |
| 2018/0343338 A1 | 11/2018 | Prasad et al. |
| 2019/0019507 A1 | 1/2019 | Abrahams et al. |
| 2019/0042988 A1 | 2/2019 | Brown et al. |
| 2019/0324600 A1 | 10/2019 | Wipperfürth |
| 2019/0392821 A1 | 12/2019 | Kline et al. |
| 2021/0210203 A1 | 7/2021 | Bhogal et al. |

OTHER PUBLICATIONS

Skantze, Turn-taking in Conversational Systems and Human-Robot Interaction: a Review, Dec. 16, 2020.
Johnson, Microsoft's AI lets bots predict pauses and interrupt conversations, Apr. 4, 2018, https://venturebeat.com/ai/microsofts-ai-lets-bots-predict-pauses-and-interrupt-conversations/.

\* cited by examiner

*Primary Examiner* — John B Walsh
(74) *Attorney, Agent, or Firm* — Garg Law Firm, PLLC; Rakesh Garg; Michael O'Keefe

(57) ABSTRACT

An embodiment intercepts a first notification intended for a user. An embodiment identifies, by analyzing a currently occurring interaction including the user, a lull in the interaction. An embodiment delivers during the lull, the first notification to the user.

20 Claims, 4 Drawing Sheets

CONTEXT BASED USER NOTIFICATION ADJUSTMENT AND MANAGEMENT

BACKGROUND

The present invention relates generally to notification management. More particularly, the present invention relates to a method, system, and computer program for context based user notification adjustment and management.

A notification is a message to a user. Typically, a notification notifies a user that an event has happened (e.g., a package has been delivered or an invitee has accepted a meeting invitation) or is happening now or upcoming (e.g., a user's meeting starts in five minutes or a user should turn right at the next traffic light. Notifications are typically delivered to a computer or mobile device of a user, for example in text or audio form.

A user's notification context, or a user's context, refers to the user's environment and condition when a notification for a user is received. In one example notification context, User A is driving a car and relying on notifications from a mapping or routing system for directions to a destination. User A is also having a conversation with a passenger, User B. In another example notification context, User C is meeting with his manager at work. In another example notification context, User D is taking a break from work by drinking coffee and reading a sports website.

A virtual agent or software agent is software that acts on behalf of a user, thus acting as the user's agent. Note that the user can be a human user or another software application. A virtual agent is often used to manage notifications to a user.

SUMMARY

The illustrative embodiments provide for context based user notification adjustment and management. An embodiment includes intercepting a first notification intended for a user. An embodiment includes identifying, by analyzing a currently occurring interaction including the user, a lull in the interaction. An embodiment includes delivering, during the lull, the first notification to the user. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
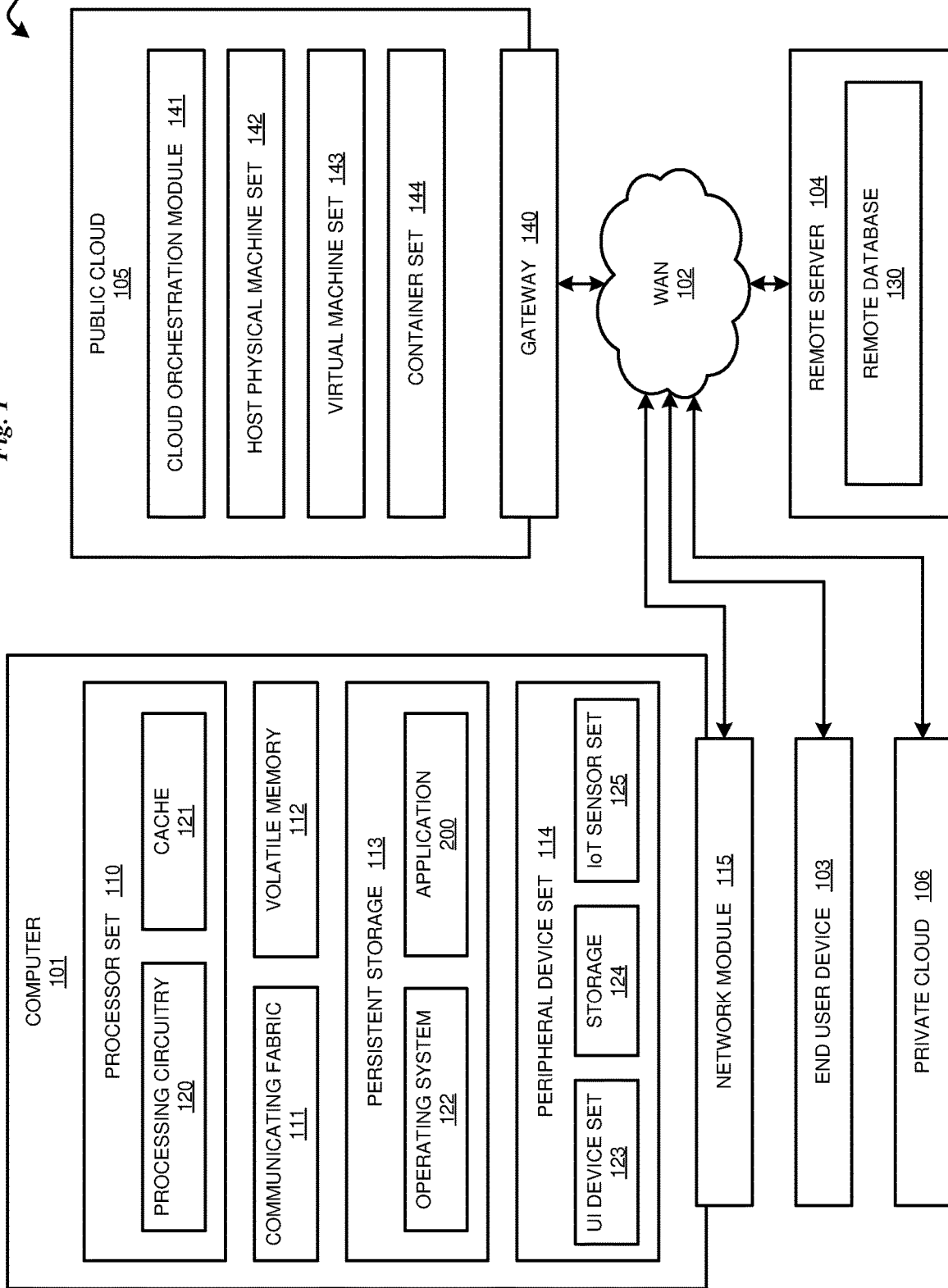
FIG. 1 depicts a block diagram of a computing environment in accordance with an illustrative embodiment.

The illustrative embodiments recognize that notifications can occur at inopportune times, for example when the user is engaged in a conversation, a meeting, or another interaction with other humans. However, some notifications are more urgent than others. For example, a notification that a package has been delivered can likely be delivered to a user anytime between now and whenever it is convenient for the user to collect the package, but a notification that the user should turn right at the next traffic light must be delivered in time for the user to make the upcoming turn. Further, a user's notification context often includes a point which should not be interrupted (e.g., while a speaker is in the middle of a sentence or thought) and another point which could be interrupted (e.g., when no one is speaking, or between agenda items in a meeting). Thus, the illustrative embodiments recognize that there is a need to recognize a user's notification context and deliver, adjust, or suppress a notification for a user according to the user's notification context.

The present disclosure addresses the deficiencies described above by providing a process (as well as a system, method, machine-readable medium, etc.) that intercepts a notification intended for a user, identifies an urgency level of a currently occurring interaction including the user, identifies a lull in the interaction, and delivers the notification during the lull. Thus, the illustrative embodiments provide for context based user notification adjustment and management.

Illustrative embodiments include a setup module, in which a user opts into notification management and the data gathering necessary to an embodiment's implementation of notification management, including the use of one or more sensors to monitor a user's interactions.

An embodiment invites a user to specify, using a user profile, an urgency level of notifications from a particular source, on a particular topic, referring to an event that is less than a threshold amount of time after the notification, or other criteria an embodiment uses to identify an urgency level of a notification for the user. An embodiment invites a user to specify, using a user profile, an urgency level of interactions, involving a particular person (e.g., the user's manager) or group, on a particular topic, taking place at a particular location (e.g., the user's office, or in the user's car), or other criteria an embodiment uses to identify an urgency level of an interaction including the user. Another embodiment learns an urgency level of notifications from a particular source, on a particular topic, referring to an event that is less than a threshold amount of time after the notification, or other criteria an embodiment uses to identify an urgency level of a notification for the user, and adds the learned data to a user profile. Another embodiment learns an urgency level of interactions, involving a particular person (e.g., the user's manager) or group, on a particular topic, taking place at a particular location (e.g., the user's office, or in the user's car), or other criteria an embodiment uses to identify an urgency level of an interaction including the user.

An embodiment intercepts a notification intended for a user who has opted into notification management. Because audio notifications are often perceived as more disruptive than notifications in text form of, one embodiment intercepts only audio notifications intended for the user.

Using data and metadata of an intercepted notification, an embodiment identifies an urgency level of the notification. Some non-limiting examples of notification data and metadata are a source of the notification, contents of the notification itself (optionally converted from audio to text, using a presently available technique, for analysis), and how often the source generates notifications, and the like. One embodiment uses a presently available technique to extract, from contents of the notification itself, a topic of the notification. Another embodiment uses a presently available technique to extract, from contents of the notification itself, whether the notification refers to a past or a future event and how far in the past or the future the event is.

One embodiment uses a set of rules or heuristics to identify an urgency level of the notification. One example rule might assign a particular urgency level according to data stored in a user profile. Another example rule might assign a particular urgency level according to the source of the notification. For example, notifications from a mapping application might always be assigned to the highest urgency level (because directions must be acted on before a user reaches a particular place), or notifications from a package delivery service might always be assigned to the lowest urgency level. Another example rule might assign work-related notifications to a higher urgency level than non-work-related notifications. Another example rule might assign an urgency level that is inversely proportional to how far in the future an event being notified is. For example, an event that must be acted on in the next minute (e.g., an upcoming turn while driving) might have a higher urgency level than an event that must be acted on in the next five minutes (e.g., a meeting that starts in five minutes), while an event that must be acted on sometime today would have the lowest urgency level. Other rules or heuristics, and combinations of rules or heuristics, are also possible and contemplated within the scope of the illustrative embodiments. Another embodiment uses a trained machine learning model to identify an urgency level of the notification. The machine learning model is trained, using notification training data of the user or other similar users, using a presently available technique.

An embodiment receives data and context data of a currently occurring interaction including the user. An interaction is a real-time interaction among two or more humans, conducted in person, via telecommunications (e.g., via telephone or a video conferencing application), or a combination of in person and via telecommunications (e.g., a hybrid meeting in which some participants are gathered in a physical room and other participants participate via a video conferencing application).

An embodiment, by analyzing a currently occurring interaction including the user, identifies an urgency level of the interaction. One non-limiting example of data of an interaction is audio data of the interaction (obtained using a microphone, and optionally converted to text data, using a presently available technique, for analysis). Non-limiting examples of context data of an interaction include data in a user's user profile, image data of the interaction (e.g., obtained using a video or still image camera, and used to determine how many people are present at the interaction and recognize specific people if available data permits), and video conferencing application data of the interaction (e.g., obtained using a camera, microphone, and data entered into a video conferencing application, and used to determine how many people are present at the interaction remotely and recognize specific people if available data permits). Techniques are presently available to extract, from data of an interaction, how many parties have been speaking during the interaction, whether one or more specific parties have been speaking during the interaction, a topic of the interaction, a sentiment or emotion expressed in the interaction, a proportion of time in which each interaction participant speaks, a proportion of time in which no interaction participant speaks, and the like. In one embodiment, a user's profile includes data of one or more of the user's previous interactions, for use in comparing to a presently occurring interaction.

One embodiment uses a set of rules or heuristics to identify an urgency level of the interaction. One example rule might assign a particular urgency level to the interaction according to data stored in a user profile. As another example, because a large meeting is likely to be more interruptible (and hence less urgent) than a smaller or one-on-one interaction, one rule might specify that if there are more than a threshold number of parties to an interaction, lower the urgency level by a number of categories or a specified amount relative to a similar interaction involving fewer human participants. As another example, because a one-on-one meeting with a user's manager, during the workday, is likely to be less interruptible (and hence more urgent) than a meeting with a friend of the user who is not also a coworker, one rule might specify that an interaction with the manager has a higher urgency level than an interaction with the friend. As another example, because a work-related meeting is likely to be less interruptible (and hence more urgent) than a meeting that is not work-related, one rule might specify that an interaction having a specific topic or family of topics has a higher urgency level than an interaction on another topic. Another example rule might specify that if a particular emotion or sentiment, or a higher-than-a-threshold level of a particular emotion or sentiment, is detected, raise the urgency level by a specified number of categories or a specified amount. Another example rule might specify that an interaction's urgency is proportional to the amount of time the user spends speaking during the interaction. Another example rule might specify that an interaction's urgency is inversely proportional to the amount of time no one speaks during the interaction. Other rules or heuristics, and combinations of rules or heuristics, are also possible and contemplated within the scope of the illustrative embodiments. Another embodiment uses a trained machine learning model to identify an urgency level of the interaction. The machine learning model is trained, using training data of the user or other similar users, using a presently available technique.

If the urgency level of the notification is greater than the urgency level of the currently occurring interaction, an embodiment interrupts the currently occurring interaction to deliver the notification upon receipt by the embodiment. For example, the urgency level of the currently occurring interaction might be the lowest available level (because the user is joking about sports with a work colleague), and the urgency level of the notification is higher than the lowest available level (because the user is about to be late to a scheduled meeting with his or her manager). Thus, the embodiment interrupts the currently occurring interaction to deliver the notification, via audio on a device of the user, that the user must leave for the manager meeting, possibly interrupting the interaction.

If the urgency level of the notification is equal to the urgency level of the currently occurring interaction, an embodiment monitors the interaction to identify a lull in the interaction, and delivers the notification during the lull. For example, the urgency level of the currently occurring interaction might be in the middle of the urgency level range, because the user is driving and conversing with a passenger. The urgency level of the notification might be equal to the urgency level of the interaction, because the user is relying on a mapping application for driving directions and a turn in the route is approaching. Thus, the embodiment monitors the interaction to identify a lull in the interaction (e.g., when no one is speaking, or when the topic appears to be changing), and delivers the notification, via audio on a device of the user, during the lull. If necessary due to the delay, an embodiment adjusts the notification to take the delivery delay into account. For example, if the original notification was to take exit 123 from a highway in 2 miles, and now the user is only a mile from the exit, an embodiment might adjust the notification to instruct the user to take exit 123 from the highway in 1 mile.

While waiting for a lull in the interaction, an embodiment re-identifies an urgency level of the notification. If the new urgency level of the notification is now greater than the urgency level of the currently occurring interaction, an embodiment interrupts the currently occurring interaction to deliver the notification, via audio on a device of the user. An upgrade to the urgency level of the currently occurring interaction can occur if waiting for lull caused a less urgent notification to become more urgent simply because of the wait. For example, if the original notification was to take exit 123 from a highway in 2 miles, and now the user is only half a mile from the exit and in danger of missing the exit, an embodiment might adjust the notification to instruct the user to take exit 123 from the highway in half a mile and deliver the notification without waiting additional time for a lull. An upgrade to the urgency level of the currently occurring interaction can also occur if an embodiment has been waiting for a lull for more than a user-defined amount of time. For example, a user might specify that all notifications in a particular category (e.g., an error rate on a device the user is responsible for supporting), be delivered within 30 minutes of the notification being triggered.

If the urgency level of the notification is less than the urgency level of the currently occurring interaction, or if an embodiment does not detect a lull in the interaction (and an urgency level of the notification is not raised while waiting for a lull), one embodiment monitors the interaction to identify when the interaction has been completed, and delivers the notification, via audio on a device of the user, once the interaction is over. Another embodiment does not wait for the interaction to be completed, but instead delivers the notification using a non-audio method (e.g., using text).

An embodiment adjusts one or more of a rule or neural network model used in urgency level determination, an amount of time to wait for a lull in an interaction, or another notification parameter based on a user's reaction to one or more previous notifications. For example, if an embodiment assigns the highest urgency level to notifications regarding Topic A, and does not wait for a lull to deliver a notification regarding Topic A, and the user reacts by saying, "that can wait", an embodiment might assign future notifications regarding Topic A to the next-highest urgency level. One embodiment stores adjusted rules or an adjusted neural network model in a user profile maintained for the user.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as an application module 200 that provides context based user notification adjustment and management. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
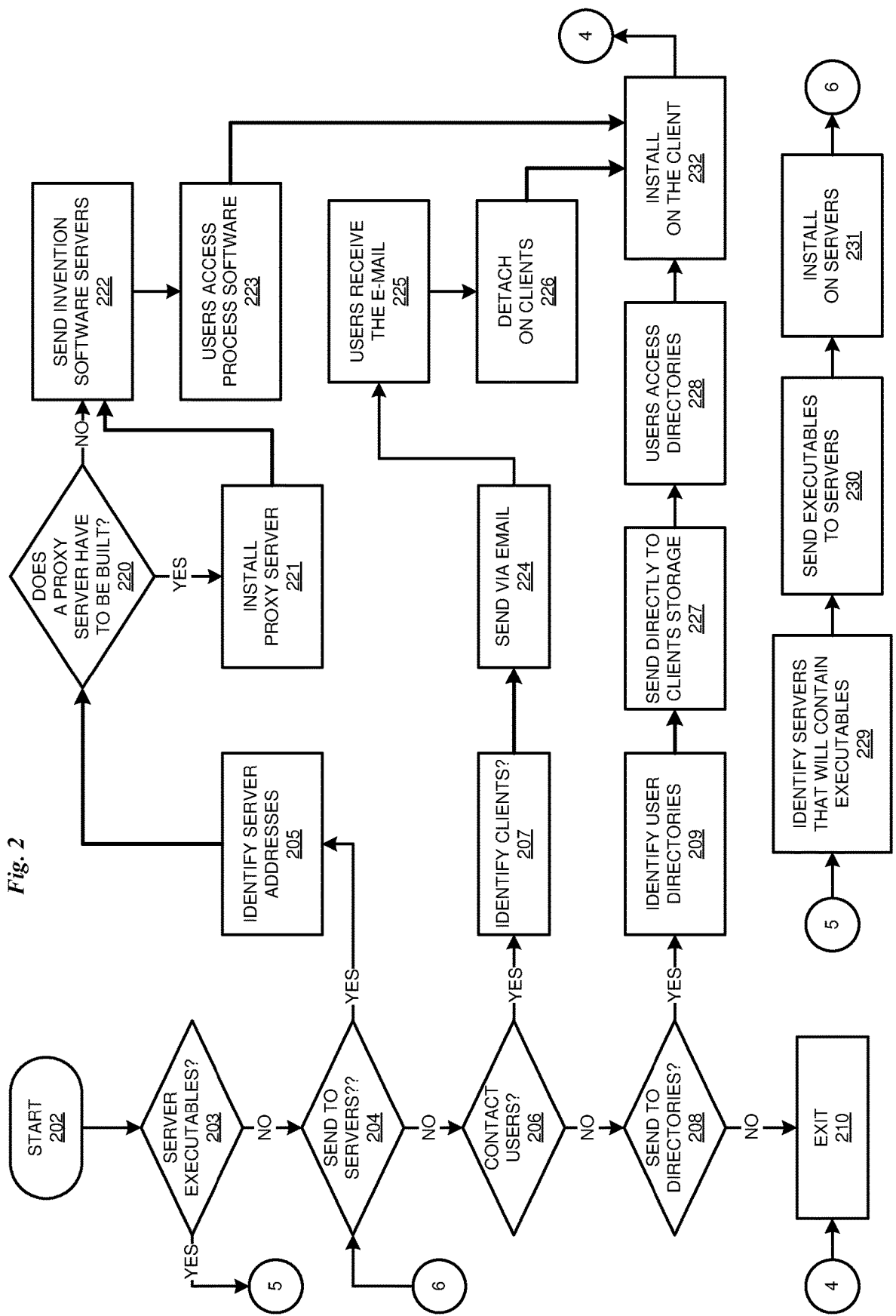
FIG. 2 depicts a flowchart of an example process for loading of process software in accordance with an illustrative embodiment.

With reference to FIG. 2, this figure depicts a flowchart of an example process for loading of process software in accordance with an illustrative embodiment. The flowchart can be executed by a device such as computer 101, end user device 103, remote server 104, or a device in private cloud 106 or public cloud 105 in FIG. 1.

While it is understood that the process software implementing context based user notification adjustment and management may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 202 begins the deployment of the process software. An initial step is to determine if there are any programs that will reside on a server or servers when the process software is executed (203). If this is the case, then the servers that will contain the executables are identified (229). The process software for the server or servers is transferred directly to the servers' storage via FTP or some other protocol or by copying though the use of a shared file system (230). The process software is then installed on the servers (231).

Next, a determination is made on whether the process software is to be deployed by having users access the process software on a server or servers (204). If the users are to access the process software on servers, then the server addresses that will store the process software are identified (205).

A determination is made if a proxy server is to be built (220) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (221). The process software is sent to the (one or more) servers either via a protocol such as FTP, or it is copied directly from the source files to the server files via file sharing (222). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (223). Another embodiment is to have the servers automatically copy the process software to each client and then run the installation program for the process software at each client computer. The user executes the program that installs the process software on his client computer (232) and then exits the process (210).

In step 206 a determination is made whether the process software is to be deployed by sending the process software to users via e-mail. The set of users where the process software will be deployed are identified together with the addresses of the user client computers (207). The process software is sent via e-mail to each of the users' client computers (224). The users then receive the e-mail (225) and then detach the process software from the e-mail to a directory on their client computers (226). The user executes the program that installs the process software on his client computer (232) and then exits the process (210).

Lastly, a determination is made on whether the process software will be sent directly to user directories on their client computers (208). If so, the user directories are identified (209). The process software is transferred directly to the user's client computer directory (227). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (228). The user executes the program that installs the process software on his client computer (232) and then exits the process (210).

Figure 3:
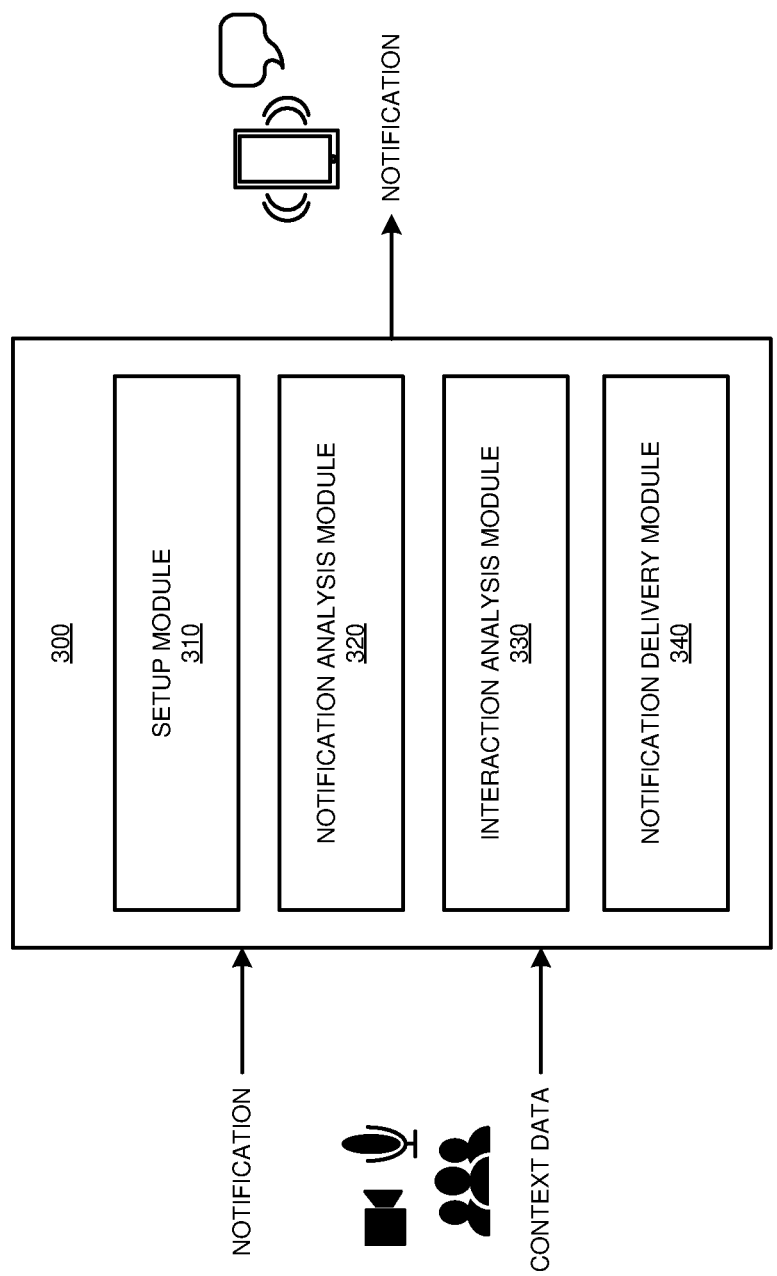
FIG. 3 depicts a block diagram of an example configuration for context based user notification adjustment and management in accordance with an illustrative embodiment.

With reference to FIG. 3, this figure depicts a block diagram of an example configuration for context based user notification adjustment and management in accordance with an illustrative embodiment. Application 300 is the same as application 200 in FIG. 1.

In the illustrated embodiment, setup module 310 implements a user opting into notification management and the data gathering necessary to application 300's implementation of notification management, including the use of one or more sensors to monitor a user's interactions.

Setup module 310 invites a user to specify, using a user profile, an urgency level of notifications from a particular source, on a particular topic, referring to an event that is less than a threshold amount of time after the notification, or other criteria an embodiment uses to identify an urgency level of a notification for the user. Module 310 invites a user to specify, using a user profile, an urgency level of interactions, involving a particular person (e.g., the user's manager) or group, on a particular topic, taking place at a particular location (e.g., the user's office, or in the user's car), or other criteria an embodiment uses to identify an urgency level of an interaction including the user. Another implementation of module 310 learns an urgency level of notifications from a particular source, on a particular topic, referring to an event that is less than a threshold amount of time after the notification, or other criteria application 300 uses to identify an urgency level of a notification for the user, and adds the learned data to a user profile. Another implementation of module 310 learns an urgency level of interactions, involving a particular person (e.g., the user's manager) or group, on a particular topic, taking place at a particular location (e.g., the user's office, or in the user's car), or other criteria application 300 uses to identify an urgency level of an interaction including the user.

Notification analysis module 320 intercepts a notification intended for a user who has opted into notification management. Because audio notifications are often perceived as more disruptive than notifications in text form of, one implementation of module 320 intercepts only audio notifications intended for the user.

Using data and metadata of an intercepted notification, module 320 identifies an urgency level of the notification. Some non-limiting examples of notification data and metadata are a source of the notification, contents of the notification itself (optionally converted from audio to text, using a presently available technique, for analysis), and how often the source generates notifications, and the like. One implementation of module 320 uses a presently available technique to extract, from contents of the notification itself, a topic of the notification. Another implementation of module 320 uses a presently available technique to extract, from contents of the notification itself, whether the notification refers to a past or a future event and how far in the past or the future the event is.

One implementation of module 320 uses a set of rules or heuristics to identify an urgency level of the notification. One example rule might assign a particular urgency level according to data stored in a user profile. Another example rule might assign a particular urgency level according to the source of the notification. For example, notifications from a mapping application might always be assigned to the highest urgency level (because directions must be acted on before a user reaches a particular place), or notifications from a package delivery service might always be assigned to the lowest urgency level. Another example rule might assign work-related notifications to a higher urgency level than non-work-related notifications. Another example rule might assign an urgency level that is inversely proportional to how far in the future an event being notified is. For example, an event that must be acted on in the next minute (e.g., an upcoming turn while driving) might have a higher urgency level than an event that must be acted on in the next five minutes (e.g., a meeting that starts in five minutes), while an event that must be acted on sometime today would have the lowest urgency level. Other rules or heuristics, and combinations of rules or heuristics, are also possible. Another implementation of module 320 uses a trained machine learning model to identify an urgency level of the notification. The machine learning model is trained, using notification training data of the user or other similar users, using a presently available technique.

Interaction analysis module 330 receives data and context data of a currently occurring interaction including the user. An interaction is a real-time interaction among two or more humans, conducted in person, via telecommunications (e.g., via telephone or a video conferencing application), or a combination of in person and via telecommunications (e.g., a hybrid meeting in which some participants are gathered in a physical room and other participants participate via a video conferencing application).

Module 330, by analyzing a currently occurring interaction including the user, identifies an urgency level of the interaction. One non-limiting example of data of an interaction is audio data of the interaction (obtained using a microphone, and optionally converted to text data, using a presently available technique, for analysis). Non-limiting examples of context data of an interaction include data in a user's user profile, image data of the interaction (e.g., obtained using a video or still image camera, and used to determine how many people are present at the interaction and recognize specific people if available data permits), and video conferencing application data of the interaction (e.g., obtained using a camera, microphone, and data entered into a video conferencing application, and used to determine how many people are present at the interaction remotely and recognize specific people if available data permits). Techniques are presently available to extract, from data of an interaction, how many parties have been speaking during the interaction, whether one or more specific parties have been speaking during the interaction, a topic of the interaction, a sentiment or emotion expressed in the interaction, a proportion of time in which each interaction participant speaks, a proportion of time in which no interaction participant speaks, and the like. In one implementation of application 300, a user's profile includes data of one or more of the user's previous interactions, for use in comparing to a presently occurring interaction.

One implementation of module 330 uses a set of rules or heuristics to identify an urgency level of the interaction. One example rule might assign a particular urgency level to the interaction according to data stored in a user profile. As another example, because a large meeting is likely to be more interruptible (and hence less urgent) than a smaller or one-on-one interaction, one rule might specify that if there are more than a threshold number of parties to an interaction, lower the urgency level by a number of categories or a specified amount relative to a similar interaction involving fewer human participants. As another example, because a one-on-one meeting with a user's manager, during the workday, is likely to be less interruptible (and hence more urgent) than a meeting with a friend of the user who is not also a coworker, one rule might specify that an interaction with the manager has a higher urgency level than an interaction with the friend. As another example, because a work-related meeting is likely to be less interruptible (and hence more urgent) than a meeting that is not work-related, one rule might specify that an interaction having a specific topic or family of topics has a higher urgency level than an interaction on another topic. Another example rule might specify that if a particular emotion or sentiment, or a higher-than-a-threshold level of a particular emotion or sentiment, is detected, raise the urgency level by a specified number of categories or a specified amount. Another example rule might specify that an interaction's urgency is proportional to the amount of time the user spends speaking during the interaction. Another example rule might specify that an interaction's urgency is inversely proportional to the amount of time no one speaks during the interaction. Other rules or heuristics, and combinations of rules or heuristics, are also possible. Another implementation of module 330 uses a trained machine learning model to identify an urgency level of the interaction. The machine learning model is trained, using training data of the user or other similar users, using a presently available technique.

If the urgency level of the notification is greater than the urgency level of the currently occurring interaction, notification delivery module 340 interrupts the currently occurring interaction to deliver the notification upon receipt by application 300. For example, the urgency level of the currently occurring interaction might be the lowest available level (because the user is joking about sports with a work colleague), and the urgency level of the notification is higher than the lowest available level (because the user is about to be late to a scheduled meeting with his or her manager). Thus, module 340 interrupts the currently occurring interaction to deliver the notification, via audio on a device of the user, that the user must leave for the manager meeting, possibly interrupting the interaction.

If the urgency level of the notification is equal to the urgency level of the currently occurring interaction, module 340 monitors the interaction to identify a lull in the interaction, and delivers the notification during the lull. For example, the urgency level of the currently occurring interaction might be in the middle of the urgency level range, because the user is driving and conversing with a passenger. The urgency level of the notification might be equal to the urgency level of the interaction, because the user is relying on a mapping application for driving directions and a turn in the route is approaching. Thus, module 340 monitors the interaction to identify a lull in the interaction (e.g., when no one is speaking, or when the topic appears to be changing), and delivers the notification, via audio on a device of the user, during the lull. If necessary due to the delay, module 340 adjusts the notification to take the delivery delay into account. For example, if the original notification was to take exit 123 from a highway in 2 miles, and now the user is only a mile from the exit, module 340 might adjust the notification to instruct the user to take exit 123 from the highway in 1 mile.

While waiting for a lull in the interaction, module 340 re-identifies an urgency level of the notification. If the new urgency level of the notification is now greater than the urgency level of the currently occurring interaction, module 340 interrupts the currently occurring interaction to deliver the notification, via audio on a device of the user. An upgrade to the urgency level of the currently occurring interaction can occur if waiting for lull caused a less urgent notification to become more urgent simply because of the wait. For example, if the original notification was to take exit 123 from a highway in 2 miles, and now the user is only half a mile from the exit and in danger of missing the exit, module 340 might adjust the notification to instruct the user to take exit 123 from the highway in half a mile and deliver the notification without waiting additional time for a lull. An upgrade to the urgency level of the currently occurring interaction can also occur if module 340 has been waiting for a lull for more than a user-defined amount of time. For example, a user might specify that all notifications in a particular category (e.g., an error rate on a device the user is responsible for supporting), be delivered within 30 minutes of the notification being triggered.

If the urgency level of the notification is less than the urgency level of the currently occurring interaction, or if module 340 does not detect a lull in the interaction (and an urgency level of the notification is not raised while waiting for a lull), one implementation of module 340 monitors the interaction to identify when the interaction has been completed, and delivers the notification, via audio on a device of the user, once the interaction is over. Another implementation of module 340 does not wait for the interaction to be completed, but instead delivers the notification using a non-audio method (e.g., using text).

Application 300 adjusts one or more of a rule or neural network model used in urgency level determination, an amount of time to wait for a lull in an interaction, or another notification parameter based on a user's reaction to one or more previous notifications. For example, if application 300 assigns the highest urgency level to notifications regarding Topic A, and does not wait for a lull to deliver a notification regarding Topic A, and the user reacts by saying, "that can wait", application 300 might assign future notifications regarding Topic A to the next-highest urgency level. One implementation of application 300 stores adjusted rules or an adjusted neural network model in a user profile maintained for the user.

Figure 4:
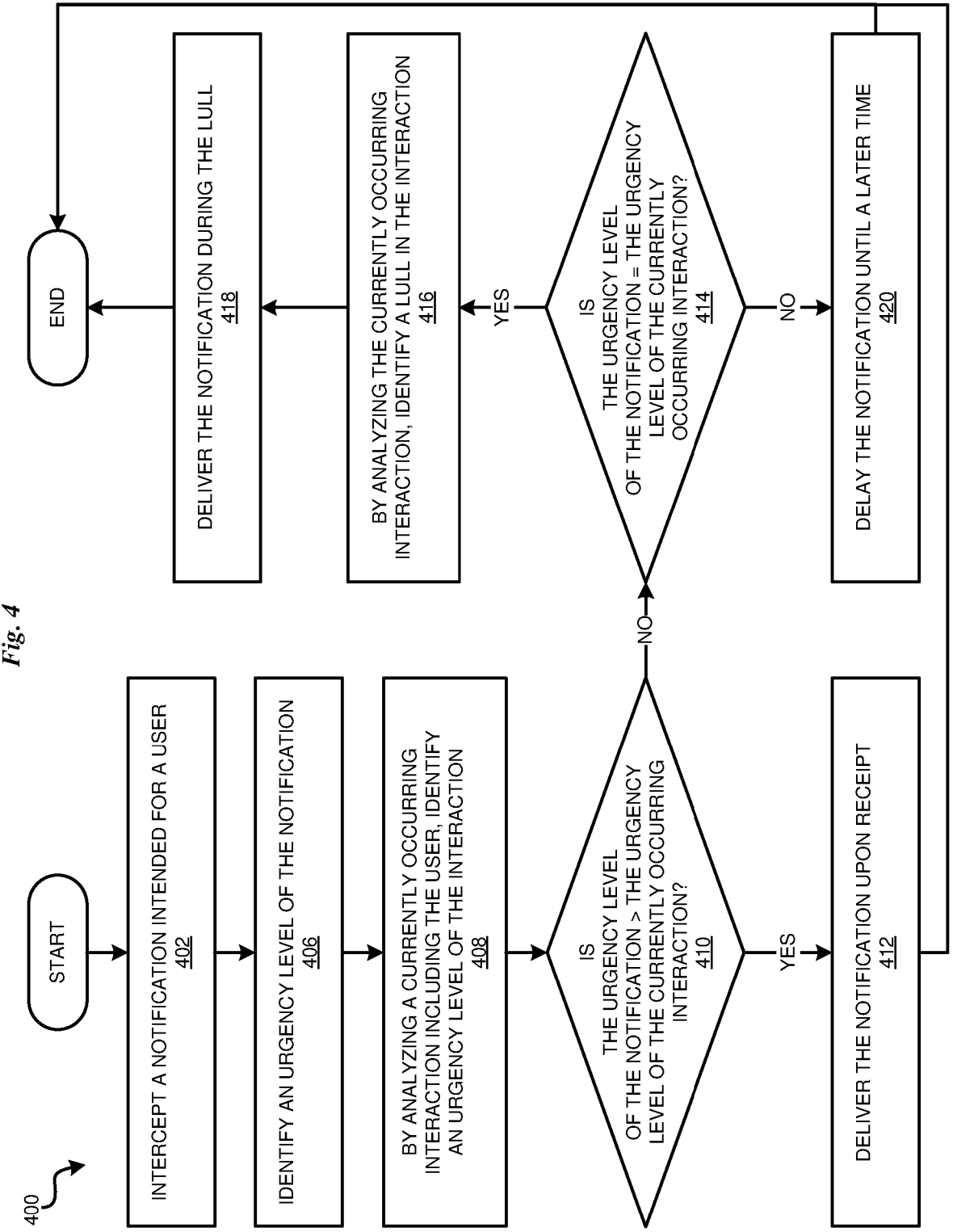
FIG. 4 depicts a flowchart of an example process for context based user notification adjustment and management in accordance with an illustrative embodiment.

With reference to FIG. 4, this figure depicts a flowchart of an example process for context based user notification adjustment and management in accordance with an illustrative embodiment. Process 400 can be implemented in application 300 in FIG. 3.

In the illustrated embodiment, at block 402, the process intercepts a notification intended for a user. At block 406, the process identifies an urgency level of the notification. At block 408, the process, by analyzing a currently occurring interaction including the user, identifies an urgency level of the interaction. At block 410, the process determines whether the urgency level of the notification is greater than the urgency level of the currently occurring interaction. If yes ("YES" path of block 410), at block 412, the process delivers the notification upon receipt, then ends. If no ("NO" path of block 410), at block 414, the process determines whether the urgency level of the notification is equal to the urgency level of the currently occurring interaction. If yes ("YES" path of block 414), at block 416, the process, by analyzing the currently occurring interaction, identifies a lull in the interaction. At block 418, the process delivers the notification during the lull, then ends. Otherwise ("NO" path of block 414), at block 420, the process delays the notification until a later time, then ends.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
    intercepting, during a currently occurring interaction, a first notification intended for a user;
    initially training a neural network model on notification data associated with a group of users;
    further training, using machine learning, the neural network model with at least one previous interaction of the user, the further training producing a machine learning trained model;
    causing, at least based on an analysis of data and metadata corresponding to the first notification, the machine learning trained model to produce an urgency level corresponding to the first notification;
    causing, responsive to at least (i) a level of engagement of the user in the currently occurring interaction, (ii) an emotion/sentiment associated with the currently occurring interaction, and (iii) a comparison of the currently occurring interaction with the at least one previous interaction of the user, the machine learning trained model to produce an urgency level corresponding to the currently occurring interaction;
    identifying, by analyzing the currently occurring interaction including the user, a lull in the currently occurring interaction, the lull comprising an amount of time in which the urgency level of the first notification becomes greater than the urgency level of the currently occurring interaction;

delivering, during the lull, the first notification to the user;

receiving information associated with a delivery of the first notification, the information including at least a user reaction to the first notification; and adjusting the machine learning trained model based on the user reaction.

2. The computer-implemented method of claim 1, further comprising:

adjusting, prior to the delivering, the first notification, the adjusting altering a time element included in the first notification.

3. The computer-implemented method of claim 1, further comprising:

intercepting a second notification intended for the user;

determining, by analyzing the currently occurring interaction, that an urgency of the second notification is greater than an urgency of the currently occurring interaction; and delivering, upon receipt, the second notification to the user.

4. The computer-implemented method of claim 1, further comprising:

intercepting a third notification intended for the user;

determining, by analyzing the currently occurring interaction, that an urgency of the third notification is less than or equal to an urgency of the currently occurring interaction; and delaying, until a later time, the third notification to the user.

5. The computer-implemented method of claim 1, wherein an urgency level of the currently occurring interaction is identified according to an identity of a second participant in the currently occurring interaction.

6. The computer-implemented method of claim 1, wherein an urgency level of the currently occurring interaction is identified according to a topic of the currently occurring interaction.

7. A computer program product comprising one or more computer readable storage media, and program instructions collectively stored on the one or more computer readable storage media, the program instructions executable by a processor to cause the processor to perform operations comprising:

intercepting, during a currently occurring interaction, a first notification intended for a user;

initially training a neural network model on notification data associated with a group of users;

further training, using machine learning, the neural network model with at least one previous interaction of the user, the further training producing a machine learning trained model;

causing, at least based on an analysis of data and metadata corresponding to the first notification, the machine learning trained model to produce an urgency level corresponding to the first notification;

causing, responsive to at least (i) a level of engagement of the user in the currently occurring interaction, (ii) an emotion/sentiment associated with the currently occurring interaction, and (iii) a comparison of the currently occurring interaction with the at least one previous interaction of the user, the machine learning trained model to produce an urgency level corresponding to the currently occurring interaction;

identifying, by analyzing the currently occurring interaction including the user, a lull in the currently occurring interaction, the lull comprising an amount of time in which the urgency level of the first notification becomes greater than the urgency level of the currently occurring interaction;

delivering, during the lull, the first notification to the user;

receiving information associated with a delivery of the first notification, the information including at least a user reaction to the first notification; and adjusting the machine learning trained model based on the user reaction.

8. The computer program product of claim 7, wherein the stored program instructions are stored in a computer readable storage device in a data processing system, and wherein the stored program instructions are transferred over a network from a remote data processing system.

9. The computer program product of claim 7, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

10. The computer program product of claim 7, further comprising:

adjusting, prior to the delivering, the first notification, the adjusting altering a time element included in the first notification.

11. The computer program product of claim 7, further comprising:

intercepting a second notification intended for the user;

determining, by analyzing the currently occurring interaction, that an urgency of the second notification is greater than an urgency of the currently occurring interaction; and delivering, upon receipt, the second notification to the user.

12. The computer program product of claim 7, further comprising:

intercepting a third notification intended for the user;

determining, by analyzing the currently occurring interaction, that an urgency of the third notification is less than or equal to an urgency of the currently occurring interaction; and delaying, until a later time, the third notification to the user.

13. The computer program product of claim 7, wherein an urgency level of the currently occurring interaction is identified according to an identity of a second participant in the interaction.

14. The computer program product of claim 7, wherein an urgency level of the currently occurring interaction is identified according to a topic of the interaction.

15. A computer system comprising a processor and one or more computer readable storage media, and program instructions collectively stored on the one or more computer readable storage media, the program instructions executable by the processor to cause the processor to perform operations comprising:

intercepting, during a currently occurring interaction, a first notification intended for a user;

initially training a neural network model on notification data associated with a group of users;

further training, using machine learning, the neural network model with at least one previous interaction of the user, the further training producing a machine learning trained model;

causing, at least based on an analysis of data and metadata corresponding to the first notification, the machine learning trained model to produce an urgency level corresponding to the first notification;

causing, responsive to at least (i) a level of engagement of the user in the currently occurring interaction, (ii) an emotion/sentiment associated with the currently occurring interaction, and (iii) a comparison of the currently occurring interaction with the at least one previous interaction of the user, the machine learning trained model to produce an urgency level corresponding to the currently occurring interaction;

identifying, by analyzing the currently occurring interaction including the user, a lull in the currently occurring interaction, the lull comprising an amount of time in which the urgency level of the first notification becomes greater than the urgency level of the currently occurring interaction;

delivering, during the lull, the first notification to the user;

receiving information associated with a delivery of the first notification, the information including at least a user reaction to the first notification; and adjusting the machine learning trained model based on the user reaction.

16. The computer system of claim 15, further comprising:
adjusting, prior to the delivering, the first notification, the adjusting altering a time element included in the first notification.

17. The computer system of claim 15, further comprising:
intercepting a second notification intended for the user;
determining, by analyzing the currently occurring interaction, that an urgency of the second notification is greater than an urgency of the currently occurring interaction; and
delivering, upon receipt, the second notification to the user.

18. The computer system of claim 15, further comprising:
intercepting a third notification intended for the user;
determining, by analyzing the currently occurring interaction, that an urgency of the third notification is less than or equal to an urgency of the currently occurring interaction; and
delaying, until a later time, the third notification to the user.

19. The computer system of claim 15, wherein an urgency level of the currently occurring interaction is identified according to an identity of a second participant in the currently occurring interaction.

20. The computer system of claim 15, wherein an urgency level of the currently occurring interaction is identified according to a topic of the currently occurring interaction.

* * * * *